(12) United States Patent
  Atkinson et al.

(10) Patent No.: US 11,994,491 B2
(45) Date of Patent: May 28, 2024

(54) METHOD AND APPARATUS FOR IDENTIFYING SUBSTANCES USING ION MOBILITY BASED ION SEPARATION TECHNIQUES

(71) Applicant: SMITHS DETECTION-WATFORD LIMITED, Hemel Hempstead (GB)

(72) Inventors: Jonathan Richard Atkinson, Hemel Hempstead (GB); Alastair Clark, Hemel Hempstead (GB)

(73) Assignee: Smiths Detection-Watford Limited, Hemel Hempstead (GB)

( * ) Notice: Subject to any disclaimer, the term of this patent is extended or adjusted under 35 U.S.C. 154(b) by 423 days.

(21) Appl. No.: 17/264,504

(22) PCT Filed: Jul. 26, 2019

(86) PCT No.: PCT/GB2019/052102
§ 371 (c)(1),
(2) Date: Jan. 29, 2021

(87) PCT Pub. No.: WO2020/025933
PCT Pub. Date: Feb. 6, 2020

(65) Prior Publication Data
US 2021/0293753 A1    Sep. 23, 2021

(30) Foreign Application Priority Data

Jul. 31, 2018 (GB) ..................................... 1812481

(51) Int. Cl.
*G01N 27/623* (2021.01)
*G01N 27/333* (2006.01)
*G01N 27/403* (2006.01)

(52) U.S. Cl.
CPC ......... *G01N 27/623* (2021.01); *G01N 27/333* (2013.01); *G01N 27/4035* (2013.01)

(58) Field of Classification Search
CPC .. G01N 27/622; G01N 27/333; G01N 27/623; G01N 27/4035; H01J 49/06; H01J 49/061; H01J 49/0422; H01J 49/0495
See application file for complete search history.

(56) References Cited

U.S. PATENT DOCUMENTS

2002/0070338 A1    6/2002 Loboda
2008/0210861 A1    9/2008 Wu et al.
(Continued)

FOREIGN PATENT DOCUMENTS

CN    102568995 A        7/2012
CN    102568995 B   * 12/2016   ........... G01N 27/622
(Continued)

OTHER PUBLICATIONS

International Search Report for corresponding application No. PCT/GB2019/052102 dated Dec. 18, 2019, 5 pages.
(Continued)

*Primary Examiner* — David E Smith
*Assistant Examiner* — Hsien C Tsai
(74) *Attorney, Agent, or Firm* — Armstrong Teasdale LLP (57) ABSTRACT

An ion mobility spectrometry method comprising (i) applying a voltage difference between a first electrode of an ion gate and a second electrode of the ion gate to prevent ions from leaving a reaction region of an ion mobility spectrometer; (ii) opening the ion gate to allow the ions to travel from the reaction region into a modification region between the first electrode and the second electrode; (iii) applying a radio frequency, RF, voltage between the first electrode and the second electrode to fragment the ions in the modification region to provide daughter ions; (iv) allowing the daughter ions to travel from the modification region into a drift region of the ion mobility spectrometer towards a collector; (v) closing the ion gate; and (vi) determining the time of flight of the daughter ions from the ion gate to the collector.

19 Claims, 4 Drawing Sheets

(56) References Cited

U.S. PATENT DOCUMENTS

| | | | |
|---|---|---|---|
| 2013/0299712 A1* | 11/2013 | Atkinson | H01J 49/061 250/389 |
| 2016/0054263 A1 | 2/2016 | Sharp et al. | |
| 2017/0241952 A1 | 8/2017 | Atkinson et al. | |
| 2017/0248546 A1 | 8/2017 | Munro | |

FOREIGN PATENT DOCUMENTS

| | | |
|---|---|---|
| EP | 2815233 A1 | 12/2014 |
| GB | 2531285 A | 4/2016 |
| GB | 2531292 A | 4/2016 |
| RU | 2187099 C1 | 8/2002 |
| RU | 2293977 C2 | 2/2007 |
| WO | 2006114580 A1 | 11/2006 |
| WO | 2008107640 A1 | 9/2008 |
| WO | 2012098364 A1 | 7/2012 |
| WO | 2013121287 A1 | 8/2013 |
| WO | 2017017479 A1 | 2/2017 |

OTHER PUBLICATIONS

GB Search Report in GB Application No. 1812481.8, dated Mar. 15, 2019. 1 page.
China First Office Action, Application No. 201980051317.9, dated Aug. 26, 2023, 61 pps.: with English translation.
European Extended Search Report, Application No. 23195136.9, dated Jan. 29, 2024, 11 pps.

* cited by examiner

METHOD AND APPARATUS FOR IDENTIFYING SUBSTANCES USING ION MOBILITY BASED ION SEPARATION TECHNIQUES

FIELD OF INVENTION

The present invention relates to methods and apparatus for identifying substances of interest, and more particularly to methods and apparatus for selecting and/or modifying ions to assist in the identification of a substance of interest in a sample.

BACKGROUND

There is a need to detect traces of substances of interest such as explosives, narcotics and chemical warfare agents. Reliable and accurate identification is critical. Analysis may be performed using spectrometers, such as ion mobility spectrometers and/or mass spectrometers.

Ion mobility spectrometers (IMS) can identify material from a sample of interest by ionizing the material (e.g., molecules, atoms) and measuring the time it takes the resulting ions to travel a known distance under a known electric field. This is known as time of flight ion mobility spectrometry—TOFIMS. The time of flight of packets of ions can be measured by a detector.

This time of flight is associated with the ion's mobility. An ion's mobility relates to its mass and geometry. Therefore, by measuring the time of flight of an ion in the detector it is possible to infer an identity for the ion. These times of flight may be displayed graphically or numerically as a plasmagram.

Other kinds of ion mobility spectrometry also exist. For example, in differential ion mobility spectrometry ions are selected based on the dependency of the ion mobility on electric field strength. To do this, ions may be subjected to varying electric field strengths selected so that only ions having a selected differential mobility are able to pass though the spectrometer. For example, in field asymmetric ion mobility spectrometry ions are separated by the application of a high-voltage asymmetric waveform at radio frequency (RF) combined with a DC voltage. As the electric field varies, depending on the ratio of the high-field and low-field mobility of an ion, it will migrate toward one or the other electrode. Only ions with specific differential mobility will pass through the device.

It is also possible to differentiate between ions based on their mass-to-charge ratio. Mass spectrometry works by ionizing chemical compounds to generate charged molecules or molecule fragments and measuring their mass-to-charge ratios. In a typical mass spectrometry procedure ions are separated according to their mass-to-charge ratio, typically by accelerating them and measuring the degree to which they are deflected by an applied electric or magnetic field. Some mass spectrometers operate using ion traps. Mass spectra reflect the relative abundance of detected ions as a function of their mass-to-charge ratio. The ions can be identified by comparing known masses to the identified masses or by comparing obtained spectra to known spectra. Ions of the same mass-to-charge ratio will undergo the same amount of deflection, but a single mass-charge ratio may be associated with a number of different species of ions.

To improve the ability of a spectrometer to identify ions in a sample of interest, it is suggested to modify some of the ions using a radio frequency, RF, electric field (e.g. by fragmenting them) to provide additional information which can be used to infer an identity for the ions. This provides additional degrees of freedom in the measurement of the ions, and therefore may improve the ability to resolve differences between ions. Where measurements are performed in the presence of contaminants, or in difficult operating conditions, or where a sample comprises ions with similar geometries and masses etc. the ability to detect and identify ions may be degraded. Ion modification is one way to address these issues.

It is desirable to increase the sensitivity of ion mobility spectrometry methods and that of ion mobility based ion separation methods.

SUMMARY

Aspects and examples of the invention are set out in the claims and aim to address at least a part of the above described technical problems, and related technical problems.

The methods and apparatus of the present disclosure find application in ion mobility spectrometry and in mass spectrometry systems employing ion mobility based ion separation techniques.

BRIEF DESCRIPTION OF DRAWINGS

Embodiments of the disclosure will now be described, by way of example only, with reference to the accompanying drawings, in which.

In the drawings like reference numerals are used to indicate like elements.

SPECIFIC DESCRIPTION

Figure 1:
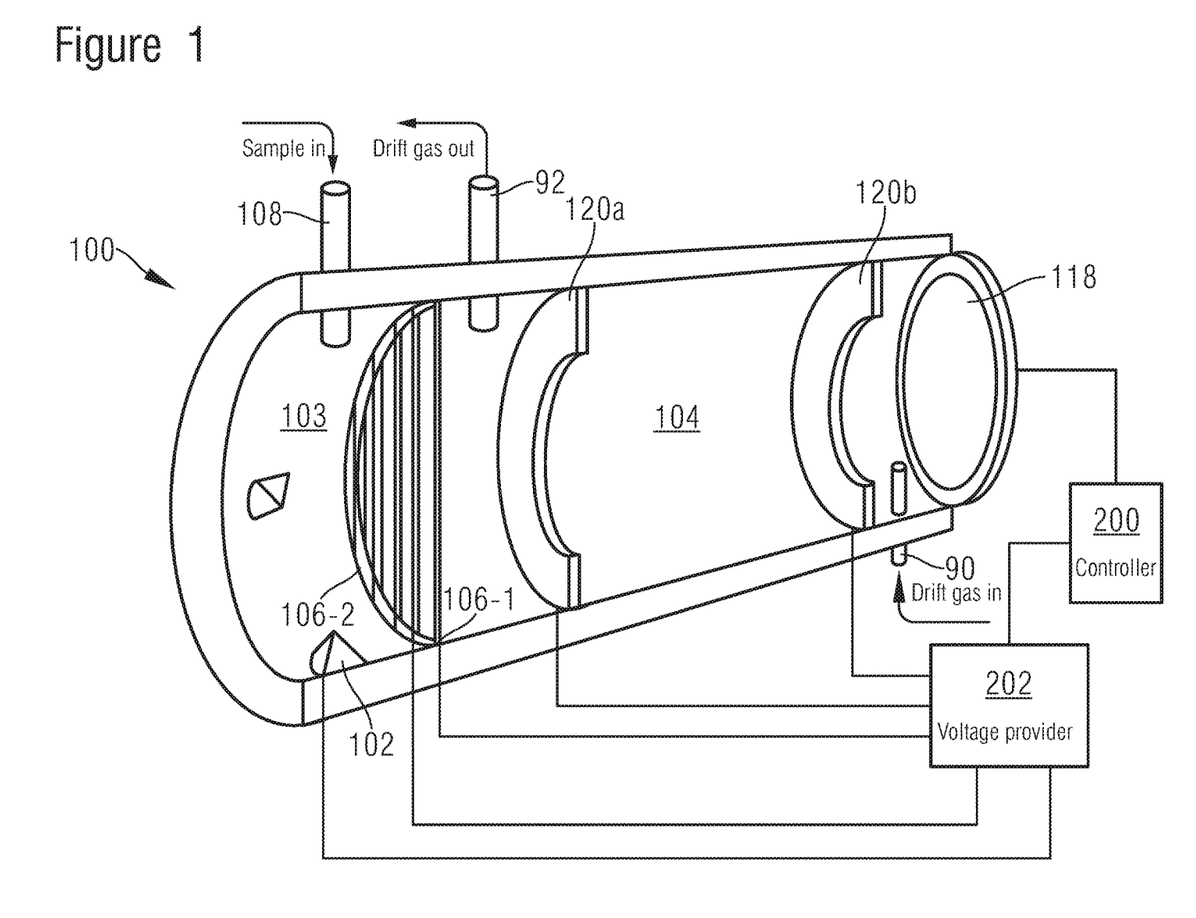
FIG. 1 shows a diagram of an ion mobility spectrometer.
Figure 2:
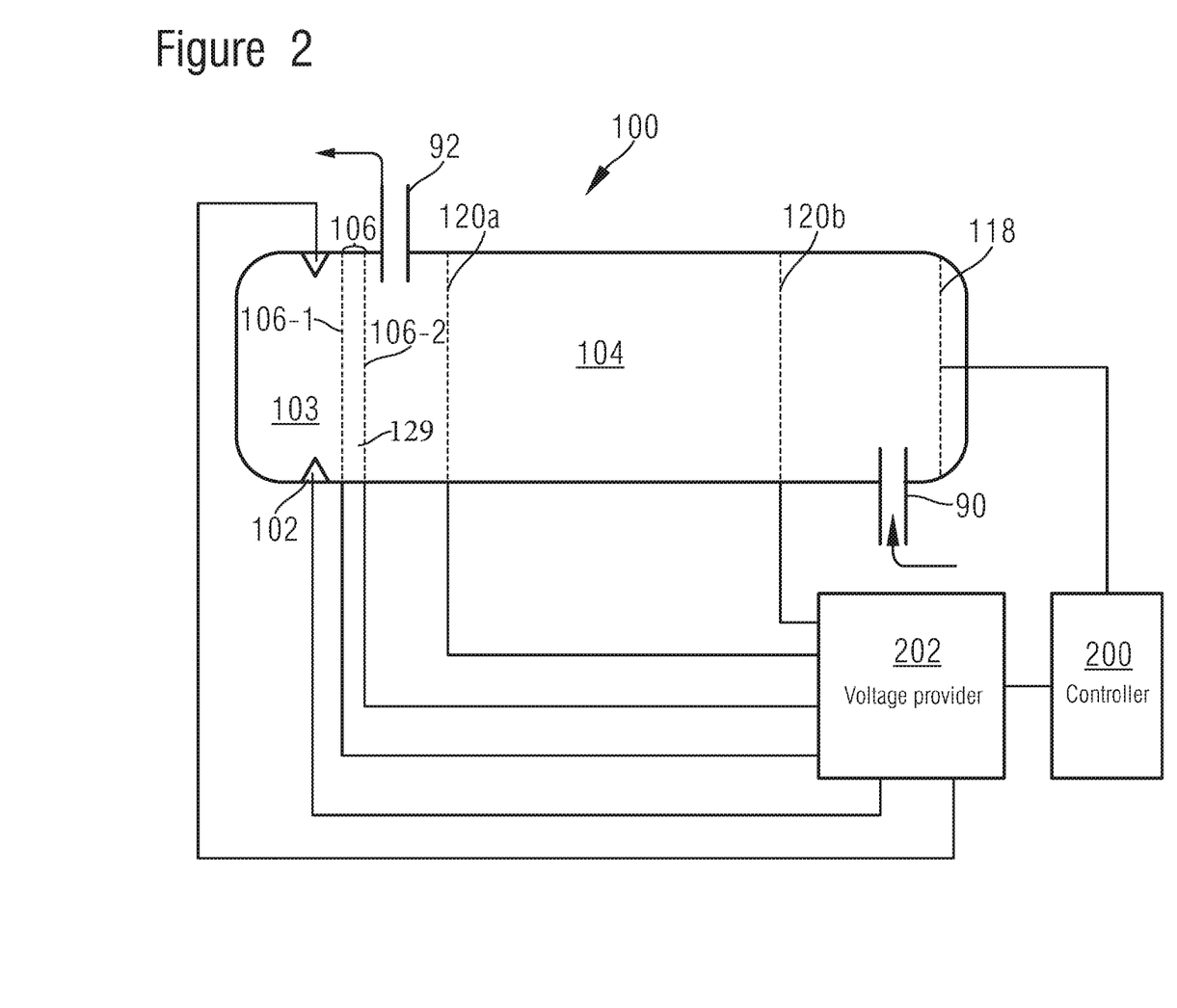
FIG. 2 shows a diagram of an ion mobility spectrometer such as that illustrated in FIG. 1.

FIG. 1 shows a cut away view of an ion mobility spectrometer, 100. FIG. 2 shows a schematic diagram of the same IMS 100 to assist in understanding the layout illustrated in FIG. 1.

As an introductory summary—the ion gate of the IMS 100 shown in FIG. 1 is used both to prevent ions from leaving the reaction region 103, and to perform ion modification. The ion gate comprises a first electrode 106-1 and a second electrode 106-2, which may be spaced apart from the first electrode 106-1 in the drift direction of the ion mobility spectrometer (e.g. in the direction of the longitudinal axis of the IMS cell).

To close the gate 106, a voltage difference is applied between the first electrode 106-1 and the second electrode 106-2 to prevent ions from leaving the reaction region 103. To open the gate, the DC voltage on the first electrode 106-1 and the second electrode 106-2 is controlled to match the voltage profile of the ion mobility spectrometer 100. In addition, while the gate is open, an RF voltage is applied between the first electrode 106-1 and the second electrode 106-2 to fragment ions as they pass through the gate 106.

Turning now to a more detailed description of FIG. 1—the IMS illustrated there may include an ioniser 102 and a reaction region 103 that is separated from a drift region 104 by a gate 106. The gate 106 comprises a first electrode 106-1 and a second electrode 106-2.

As illustrated, the IMS 100 includes an inlet 108 (not visible in FIG. 2) for enabling material from a sample to be introduced to the reaction region 103 where it can be ionised by reactant ions generated by the ioniser 102. The inlet 108 may comprise a pinhole or membrane inlet, for obtaining a sample of gaseous fluid such as a vapour or gas. The ioniser 102 may comprise a source of ions such as a corona discharge element or a radioactive source.

In the example illustrated in FIG. 1, the drift region 104 lies between the gate 106 and a collector 118. A series of drift electrodes 120a, 120b are spaced apart along the drift region 104 for providing a voltage profile for moving ions from the reaction region to the collector 118. The voltage profile applied by the drift electrodes 120a, 120b may comprise a uniform electric field (e.g. spatially uniform voltage gradient) in the drift direction from the ioniser 102 along the drift region 104 toward the collector 118.

The collector 118 may be coupled to provide a signal to a controller 200. Current flow from the collector 118 can be used by the controller 200 to infer that ions have reached the collector 118, and a characteristic of the ions can be determined based on the time for ions to pass from the gate 106 along the drift region 104 to the collector 118. Examples of a collector 118 are configured to provide a signal indicating that ions have arrived at the collector 118. For example, the collector may comprise a conductive electrode (such as a faraday plate), which may be charged to catch ions.

At the end of the drift region 104 adjacent the collector 118 a drift gas inlet 90 may be arranged for providing a flow of drift gas into the drift chamber. A drift gas outlet 92 may be provided at the end of the drift region 104 adjacent the gate 106, so that drift gas can flow from the collector 118 to the gate 106. Thus, ions can travel from the gate 106 to the collector 118 along the voltage profile and against the flow of drift gas to enable their time of flight through the drift gas to be used to infer information about their mobility. Example drift gases include, but are not limited to, nitrogen, helium, air, air that is re-circulated (e.g., air that is cleaned and/or dried) and so forth.

Each of the two gate electrodes 106-1, 106-2 can comprise an array of elongate conductors, such as wires, which may be arranged across the IMS cell—e.g. transverse to the drift direction from the reaction region to the detector. The elongate conductors may be arranged in a grid, such as a mesh. As illustrated, the conductors of each ion modifier electrode 106-1, 106-2 may have gaps between them such that ions can pass through each electrode by travelling through the gaps. The first electrode 106-1 may be provided adjacent the reaction region, and may separate the second electrode 106-2 from the reaction region.

The elongate conductors of the first electrode 106-1 may be parallel with each other, and may be arranged in a single planar array, which may span the IMS cell (e.g. the elongate conductors of the first electrode 106-1 may be coplanar with each other).

As with the first electrode, the elongate conductors of the second electrode 106-2 may also be parallel with each other, and may be arranged in a single planar array, which may span the IMS cell (e.g. the elongate conductors of the second electrode 106-2 may be coplanar with each other).

The first electrode 106-1 and the second electrode 106-2 may be non-coplanar with each other. For example they may be spaced apart from each other in the drift direction of the IMS cell. Typically, this spacing between the first electrode 106-1 and the second electrode 106-2 may be at least 200 micron. The elongate conductors of the first of the electrodes 106-1 may be parallel with those of the second electrode 106-2. In addition, the elongate conductors of the first electrode 106-1 may be laterally aligned with those of the second. For example they may be aligned with each other in a direction transverse (e.g. perpendicular) to the drift direction. Thus, when viewed along the drift direction (e.g. in the direction of the longitudinal axis of the cell) the elongate conductors of the second electrode 106-2 may be entirely hidden by those of the first 106-1. For example the two electrodes 106-1, 106-2 may be structurally identical and laterally aligned. This may help to reduce ion losses due to collision, and may also enhance sensitivity by preventing the voltage of the second electrode from distorting electric field upstream of the first.

A voltage provider 202 is connected to the ion gate 106, and to the drift electrodes 120a, 120b. It may also be connected to the ioniser. The voltage provider may comprise circuitry, such as a power supply and/or a series potential divider, configured to apply the voltage profile via the drift electrodes 120a, 120b in the drift region 104. It also comprises circuitry for providing a selected DC voltage at each of the two gate electrodes 106-1, 106-2 of the ion gate 106. And, it also comprises circuitry such as a generator of radio frequency, RF, signals for providing an RF, alternating voltage between those two same electrodes 106-1, 106-2.

A controller 200 may be connected to the voltage provider 202 for controlling these voltages and may also be connected to the collector 118 for receiving signals indicating the arrival of ions at the collector 118.

The controller 200 can thus operate the gate 106 to control passage of ions from the reaction region into the drift region 104. To prevent ions from travelling from the reaction region into the drift region it may operate the voltage provider to apply a voltage between the two electrodes 106-1, 106-2 to create a barrier to ions. This voltage may provide an electric field which opposes the electric field due to the voltage profile. For example, the voltage of the second electrode 106-2 of the ion gate 106 may be controlled to match the profile voltage at the location of the second electrode 106-2, while a different voltage can be applied to the first electrode 106-1 of the ion gate to provide an electric field which opposes the electric field due to the voltage profile.

To open the gate 106, the controller 200 may operate the voltage provider 202 so that the DC voltage between the two electrodes of the ion gate matches the profile voltage. For example, to open the gate a DC voltage can be applied to the first electrode 106-1 so that its voltage matches (e.g. is equal to) the profile voltage at its location. This can enable ions to pass through gaps between the conductors of the first electrode 106-1, into a region 129 (illustrated more clearly in FIG. 2) between the electrodes 106-1, 106-2. They may then travel out of the region 129 through the gaps between the conductors of the electrode 106-2 and continue to travel in the drift direction (e.g. down the voltage profile) towards the collector 118.

However, while the ions are in the region 129 between the electrodes 106-1, 106-2 they can be subjected to an alternating, RF, electric field. For example, the controller 200 may operate the voltage provider 202 to apply an RF voltage between the first electrode 106-1 and the second electrode 106-2 while holding the gate open (e.g. controlling the DC voltage of the two electrodes 106-1, 106-2 to match the profile voltage). For example, the RF voltage may be superimposed on the DC voltage difference between the two electrodes 106-1, 106-2.

The controller 200 and the voltage provider 202 may be configured to close the gate by returning the first electrode 106-1 of the ion gate 106 to its previous DC voltage (e.g. different from the profile voltage to create a barrier to the passage of ions). They may also be configured to switch off the RF voltage between the gate electrodes 106-1, 106-2 when the gate is closed.

Figure 3:
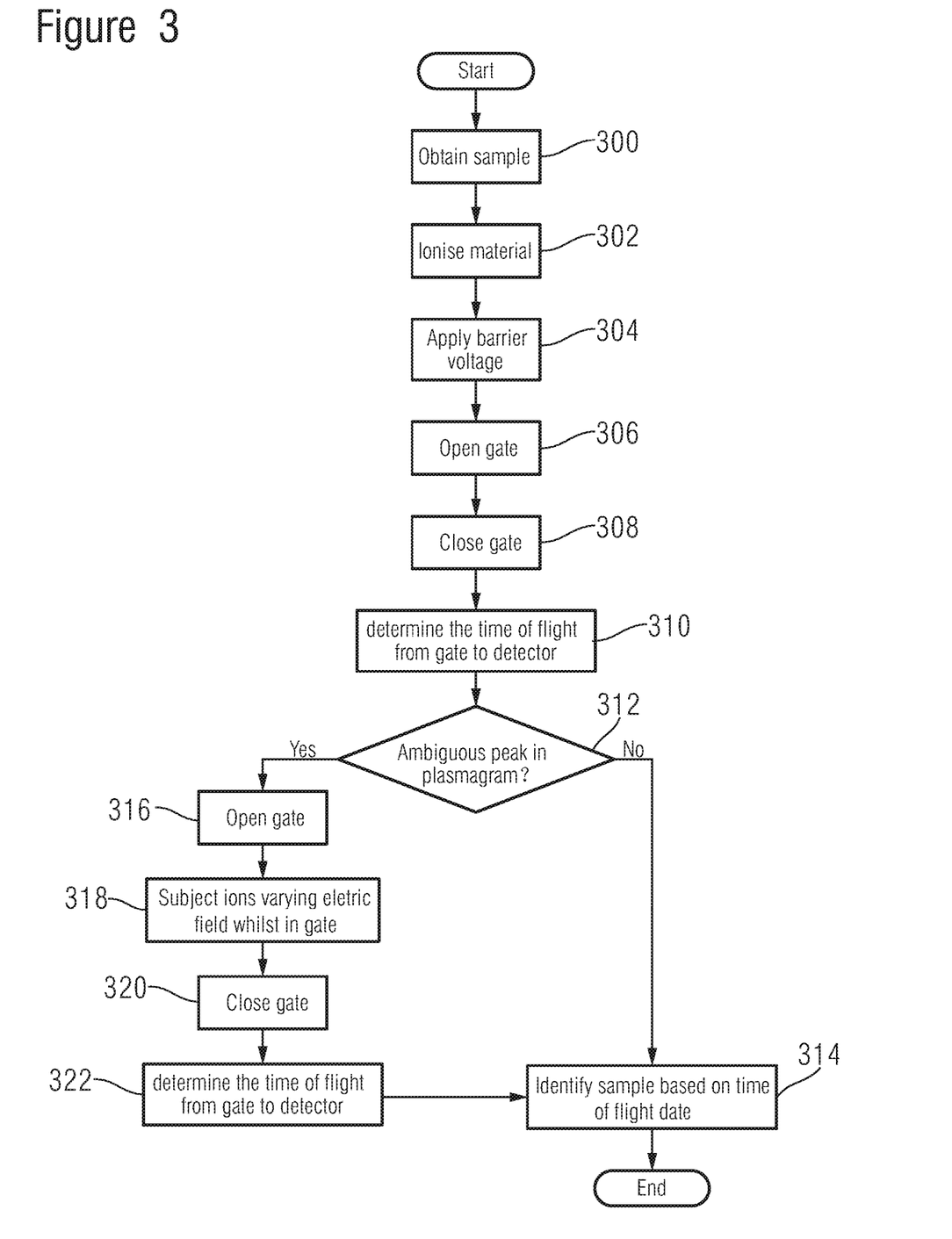
FIG. 3 is a flow chart illustrating a method of operating an ion mobility spectrometer, such as that described with reference to FIG. 1 and FIG. 2.

Operation of the apparatus illustrated in FIG. 1 and FIG. 2 will now be described with reference to FIG. 3.

Initially, a sample of gaseous fluid (e.g. a gas or vapour) may be provided 300 from the inlet to the ioniser.

The ioniser is then operated 302 to generate reactant ions which can be mixed with the sample in the reaction region to ionise the sample. To prevent ions from leaving the reaction region 103, a DC voltage, different from the profile voltage, is applied 304 between the first electrode 106-1 and the second electrode of the ion gate 106-2. This DC voltage difference opposes the voltage profile and thus prevents ions from leaving the reaction region 103 and travelling along the drift region 104.

The ion gate 106 can then be opened 306 to allow ions to travel from the reaction region down the drift region to the collector. The gate is held open in this way for a selected period (referred to as the gate width) to enable a packet of ions to travel through the gate. The gate is then closed 308. This time period (the gate width) determines the width of the packet of ions, and so also provides a fundamental limit on the time resolution of the IMS cell—typically gate widths of about 200 microseconds are used.

The packet of ions then travels along the drift chamber (down the voltage profile) against the flow of drift gas, and may spread out in the drift direction as they travel towards the collector 118—more mobile ions moving more quickly. Thus time of flight of the ions indicates their mobility through the drift gas.

The controller can receive signals from the collector indicting the arrival of the ions at the collector, and by comparing the timing of these signals with the timing of the gate opening, the time of flight of ions in the packet can be determined 310. This time of flight can in turn be used to infer information about the mobility of the ions, and thus to identify them.

It will be appreciated in the context of the present disclosure however that peaks in a plasmagram may have a certain width, and may be masked or overlap with other peaks. In addition, certain ions may bond with ions and/or molecules in the reaction region.

For these and other reasons—it may not be possible uniquely to identify ions from the plasmagram. In this eventuality, the controller may perform a repeat experiment—e.g. to repeat the measurement of time of flight on a second packet of ions.

Accordingly, the controller may determine 312 whether the time of flight data provide an ambiguity as to the identity of the ions. If not, the sample may be identified 314 based on the time of flight data.

In the event that the time of flight data does not provide unambiguous identification of the sample, the ion gate 106 can be opened 316 a second time to allow a further packet of ions to leave the reaction region. This further packet of ions may be generated by a further operation of the sample inlet 108 and ioniser 102 as described above.

Once the gate is open, this further packet of ions thus travels from the reaction region into a region 129 between the first electrode 106-1 and the second electrode 106-2.

An RF voltage is then applied 318 between the first electrode 106-1 and the second electrode 106-2. This may raise the effective temperature of the ions with the aim of fragmenting them to provide daughter ions. Typically the RF voltage applied between the electrodes is at least 2.5 MHz, and is of the order of $10^4$ Vcm$^{-1}$. For example the RF voltage may be about 8 MHz and about 40,000 Vcm$^{-1}$.

While the gate remains open, daughter ions generated by this fragmentation are able to travel (under the influence of the DC voltage difference between the two electrodes 106-1, 106-2) from the modification region into the drift region.

At the end of the gate width, the gate can be closed 320 by re-applying the barrier voltage. At this stage the RF voltage may also be switched off. The daughter ions can then travel down the drift region, along the voltage profile through the drift gas towards the collector.

The time of flight of the daughter ions from the ion gate to the collector can then be determined 322. The controller can then use the time of flight of the daughter ions, and the time of flight of the preceding packet of ions to try to identify 314 the ions.

It will be appreciated in the context of the present disclosure that the preceding cycle of operation, in which the IMS cell 100 is operated without applying the RF voltage to the gate electrodes 106-1, 106-2, is optional. The RF voltage can be applied without a preceding cycle in which it is not applied. Advantageously, because only two electrodes are used for both the gate and the ion modification process, ion losses due to collision with electrodes may be reduced. In addition, the drift time between the ion gate and the collector may be increased as compared to systems in which the ion modifier is deployed at some intermediate position along the drift chamber. These things may enhance the selectivity of IMS systems (e.g. the ability to differentiate between different species with similar mobilities).

Electrodes 120a, 120b, may be arranged to guide ions toward the collector 118, for example the drift electrodes 120a, 120b may comprise rings which may be arranged around the drift region 104 to focus ions onto the detector 118. Although the example of FIG. 1 includes only two drift electrodes 120a, 120b, in some examples a plurality of electrodes may be used, or a single electrode may be used in combination with the detector 118 to apply an electric field to guide ions toward the detector 118.

In FIG. 1 the first electrode and the second electrode are described as being spaced apart in the drift direction, but it will be appreciated in the context of the present disclosure that co planar ion gates may be used.

Figure 4:
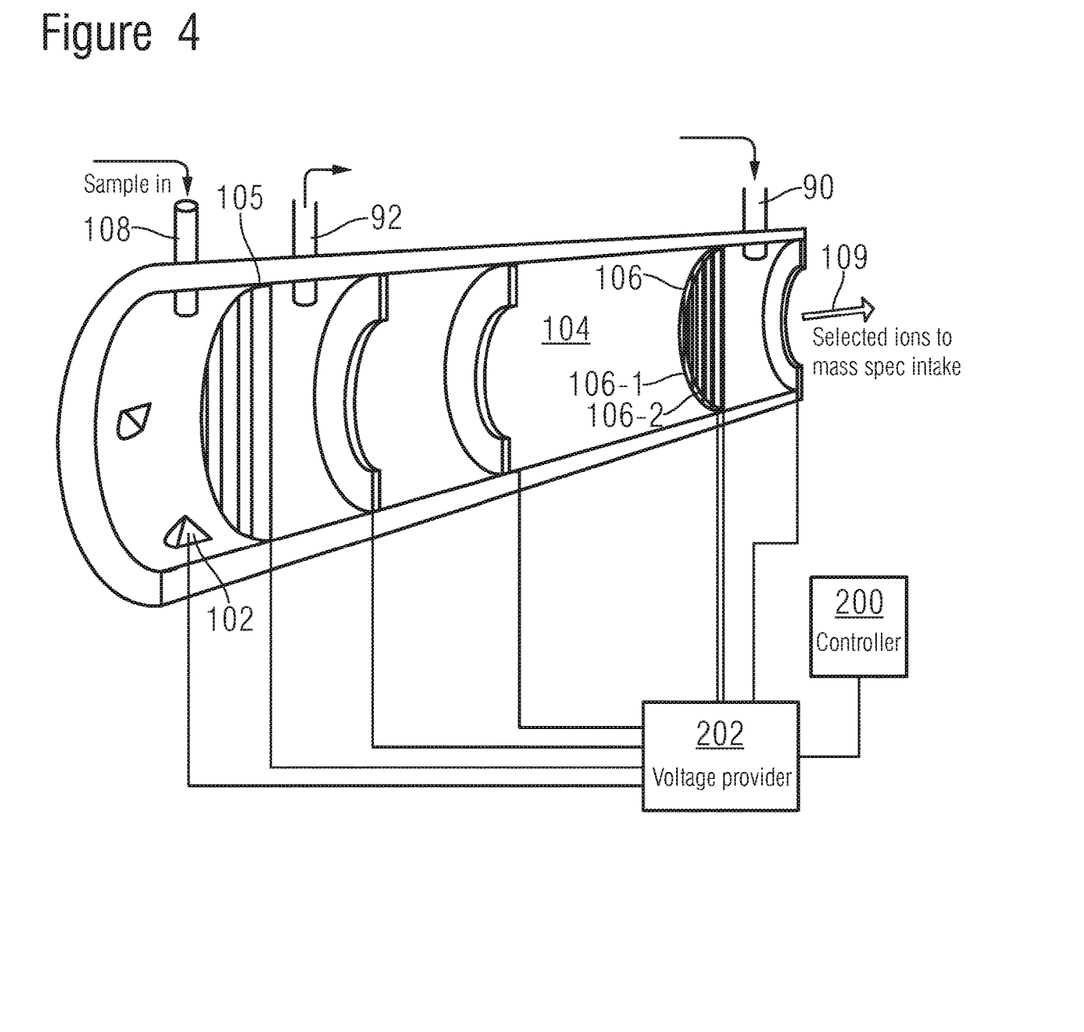
FIG. 4 shows a diagram of an ion mobility based ion separator for an inlet of a mass spectrometer.

FIG. 4 shows a diagram of an ion mobility based ion separator for an inlet of a mass spectrometer.

The apparatus illustrated in FIG. 4 is identical to those described above with reference to FIG. 1 and FIG. 2, other than in that:

(a) the ion gate which separates the reaction region from the drift region may be a standard ion gate such as a standard Bradbury-Nielsen Gate or Tyndall Powell Gate;

(b) the collector 118 is absent, and in its place is a second ion gate 106, comprising a first electrode 106-1 and a second electrode 106-2, and which may be operated as described above with reference to the ion gate 106 shown in FIG. 1 and FIG. 2.

(c) an outlet is provided behind the second ion gate, separated from the drift region 104 of the ion separator by the second ion gate.

Accordingly, the controller may select a subset of a sample of ions based on their mobility in the drift gas by controlling the relative timing of opening the first ion gate and the second ion gate. For example the timing of opening the second ion gate may be selected based on the timing of opening the first ion gate to allow only those ions having a particular time of flight along the drift chamber (and/or a selected range or ranges of times of flight) to pass to the outlet.

The outlet may comprise a capillary or other conduit adapted for connection to an inlet of a mass spectrometer. Ion focusing apparatus such as an ion guide may be arranged to direct ions along this narrow passage. The second ion gate 106 is disposed between the drift region and the outlet of the separator to provide a controllable barrier therebetween.

The two electrodes 106-1, 106-2 of the second ion gate 106 are spaced apart in a drift direction of the ion mobility separator.

As illustrated, the ion mobility based ion separator of FIG. 4 thus comprises a source of ions such as a pinhole or membrane inlet, for obtaining a sample of gaseous fluid such as a vapour or gas, and an ioniser for ionising the sample. As with the apparatus shown in FIG. 1, the ioniser may comprise a source of ions such as a corona discharge element or a radioactive source. In some embodiments the sample may be ionised using an ionised reactant gas.

In operation, the controller operates the inlet to draw a sample into the reaction region, and operates the ioniser to ionise the sample—typically by generating reactant ions for mixing with the sample in the reaction region.

The first ion gate is then opened to allow a packet of ions to travel along the drift region toward the second ion gate. It will be appreciated in the context of the present disclosure that this packet of ions may separate longitudinally as it travels along the drift chamber due to differences in mobility of the ions in the packet.

Initially, the second ion gate 106 may be held closed by applying a barrier voltage between the two electrodes 106-1, 106-2 of the second ion gate. This can cause ions arriving at the second ion gate to be neutralised on the first electrode 106-1, and thus prevented from reaching the outlet and leaving the separator via the outlet. The barrier voltage comprises a voltage which matches the voltage profile at the first electrode 106-1. This may assist in reducing disturbance of the voltage profile in the drift region.

The second ion gate 106 can then be opened (e.g. by making the voltage of the second electrode 106-2 also match the voltage profile to allow ions arriving at the first electrode 106-1 to travel onwards towards the outlet. Whilst the second ion gate 106 is open, the ions can travel into a modification region between the two electrodes of the second ion gate.

During this period, an RF voltage is applied between the two electrodes to fragment ions as they pass through the region. Daughter ions generated from this fragmentation can thus be provided to the outlet for passing to an inlet of a mass spectrometer.

The gate can then be closed again to neutralise further ions (e.g. those arriving after the selected portion of ions) and prevent them from reaching the outlet.

As noted above, opening the second ion gate may comprise applying a DC voltage difference between the two electrodes of the second ion gate. This DC voltage difference may match the voltage profile, so that the electric field along the drift region to the outlet may be uniform when the second gate is open. The RF voltage applied between the two electrodes 106-1, 106-2, to fragment the ions may be superimposed on the DC voltage difference between them.

The RF voltage between the two electrodes 106-1, 106-2 may have a frequency of at least 2.5 MHz. In an embodiment the frequency is at least 3 MHz, or at least 5 MHz, in some embodiments at least 6 MHz. In an embodiment the frequency is less than 100 MHz, in some embodiments the frequency is less than 50 MHz, in some embodiments less than 20 MHz, in some embodiments less than 15 MHz, or less than 10 MHz. For example, the frequency may be between 3 MHz and 20 MHz, or between 6 MHz and 12 MHz. In some examples the frequency is about 8 MHz.

The voltage provider may control the voltage of the two gate electrodes 106-1, 106-2 to vary, during the gate width, with a selected phase difference, for example the voltage controller may control the voltage of the two gate electrodes 106-1, 106-2 so that the positive voltage excursion of one electrode occurs during the negative voltage excursion of the other. For example, the voltage provider may control the voltage of the two gate electrodes 106-1, 106-2 to vary in anti-phase. The voltage excursions of the two electrodes may be of the same amplitude.

It will be appreciated from the discussion above that the embodiments shown in the Figures are merely exemplary, and include features which may be generalised, removed or replaced as described herein and as set out in the claims. With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

In some examples the functionality of the controller may be provided by a general purpose processor, which may be configured to perform a method according to any one of those described herein. In some examples the controller may comprise digital logic, such as field programmable gate arrays, FPGA, application specific integrated circuits, ASIC, a digital signal processor, DSP, or by any other appropriate hardware. In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein. The controller may comprise an analogue control circuit which provides at least a part of this control functionality. An embodiment provides an analogue control circuit configured to perform any one or more of the methods described herein.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An ion mobility spectrometry method comprising:
   (i) applying a voltage difference between a first electrode of an ion gate and a second electrode of the ion gate to prevent ions from leaving a reaction region of an ion mobility spectrometer;
   (ii) opening the ion gate to allow the ions to travel from the reaction region into a modification region between the first electrode of the ion gate and the second electrode of the ion gate;
   (iii) applying a radio frequency, RF, voltage between the first electrode of the ion gate and the second electrode of the ion gate to fragment the ions in the modification region to provide daughter ions;
   (iv) allowing the daughter ions to travel from the modification region into a drift region of the ion mobility spectrometer towards a collector;
   (v) closing the ion gate; and
   (vi) determining the time of flight of the daughter ions from the ion gate to the collector.

2. The method of claim 1 wherein comprising applying a voltage profile for moving the ions from the reaction region to the collector, wherein (ii) opening the gate comprises applying a DC voltage difference between the first electrode and the second electrode which matches the voltage profile.

3. The method of claim 2 wherein the first electrode is spaced apart from the second electrode in a drift direction of the ion mobility spectrometer.

4. The method of claim 3 wherein the first electrode separates the second electrode from the reaction region, and the voltage difference comprises a voltage which matches the voltage profile at the second electrode.

5. The method of claim 4 wherein applying the voltage difference comprises providing an electric field between the first electrode and the second electrode, which electric field opposes the voltage profile.

6. The method of claim 2 wherein the radio frequency voltage is superimposed on the DC voltage difference.

7. The method of claim 1 further comprising:
   prior to steps (ii) to (vi), opening the gate to allow a preceding packet of ions to travel from the reaction region into the drift region and towards the collector, closing the gate, and determining the time of flight of the preceding packet of ions from the ion gate to the collector.

8. The method of claim 7 wherein the ions and the preceding packet of ions are obtained from the same sample, the method comprising identifying the presence of a substance of interest in the sample based on the time of flight of the daughter ions and the time of flight of the preceding packet of ions.

9. An ion mobility spectrometer comprising:
   a reaction region,
   a drift region, comprising a voltage profile along which ions travel in a drift direction from the reaction region to a collector;
   an ion gate comprising a first electrode and a second electrode; and
   a gate voltage controller configured to:
      apply a voltage difference between the first electrode of the ion gate and the second electrode of the ion gate to prevent ions from leaving the reaction region;
      open the ion gate to allow the ions to travel from the reaction region into a modification region between the first electrode of the ion gate and the second electrode of the ion gate;
      apply a radio frequency voltage between first electrode of the ion gate and the second electrode of the ion gate to fragment ions in the modification region to provide daughter ions;
      to allow the daughter ions to pass from the modification region and into the drift region; and
      to close the ion gate by applying the voltage difference between the first electrode of the ion gate and the second electrode of the ion gate;
   wherein the ion mobility spectrometer is configured to determine the time of flight of the daughter ions from the ion gate through the drift region to the collector.

10. The ion mobility spectrometer of claim 9 wherein the first electrode and the second electrode each comprise a plurality of elongate conductors, and the elongate conductors of the first electrode are each aligned, in a direction transverse to the drift direction, with a corresponding elongate conductor of the second electrode.

11. The ion mobility spectrometer of claim 9 wherein the first electrode separates the second electrode from the reaction region, and the voltage difference comprises a voltage which matches the voltage profile at the second electrode.

12. The ion mobility spectrometer of claim 11 wherein applying the voltage difference comprises providing an electric field between the first electrode and the second electrode which opposes the voltage profile.

13. The ion mobility spectrometer of claim 9 wherein opening the gate comprises applying a DC voltage difference between the first electrode and the second electrode which matches the voltage profile.

14. The ion mobility spectrometer of claim 13 wherein the RF voltage is superimposed on the DC voltage difference.

15. A method of controlling an ion gate in an ion mobility spectrometer, the method comprising:
   applying a voltage difference between two electrodes of the ion gate to prevent ions from leaving a reaction region of the ion mobility spectrometer, and
   opening the gate, and while the gate is open applying an RF voltage between the same two ion gate electrodes to fragment ions as they pass through the gate.

16. The method of claim 15 wherein the two electrodes each comprise a plurality of mutually coplanar elongate conductors and the two electrodes are spaced apart in the drift direction.

17. The method of claim 16 wherein the elongate conductors of a first of the electrodes are each aligned, in a direction transverse to the drift direction, with a corresponding elongate conductor of a second of the two electrodes.

18. The method of claim 16 wherein the first electrode separates the second electrode from the reaction region and applying the voltage difference comprises applying a voltage to the second electrode which matches the voltage profile.

19. The method of claim 16 wherein opening the gate comprises applying a DC voltage difference between the two electrodes which matches a voltage profile of the ion mobility spectrometer, and the radio frequency voltage is superimposed on the DC voltage difference.

* * * * *